Figure 1:
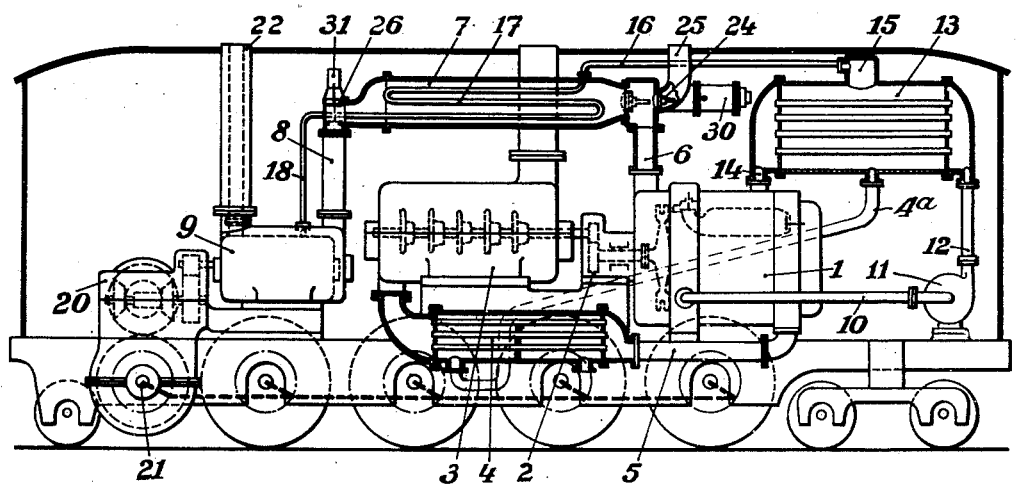

Aug. 6, 1935.   H. HOLZWARTH   2,010,021
EXPLOSION TURBINE PLANT FOR VEHICLES
Filed Jan. 30, 1931   3 Sheets-Sheet 1

Inventor
Hans Holzwarth

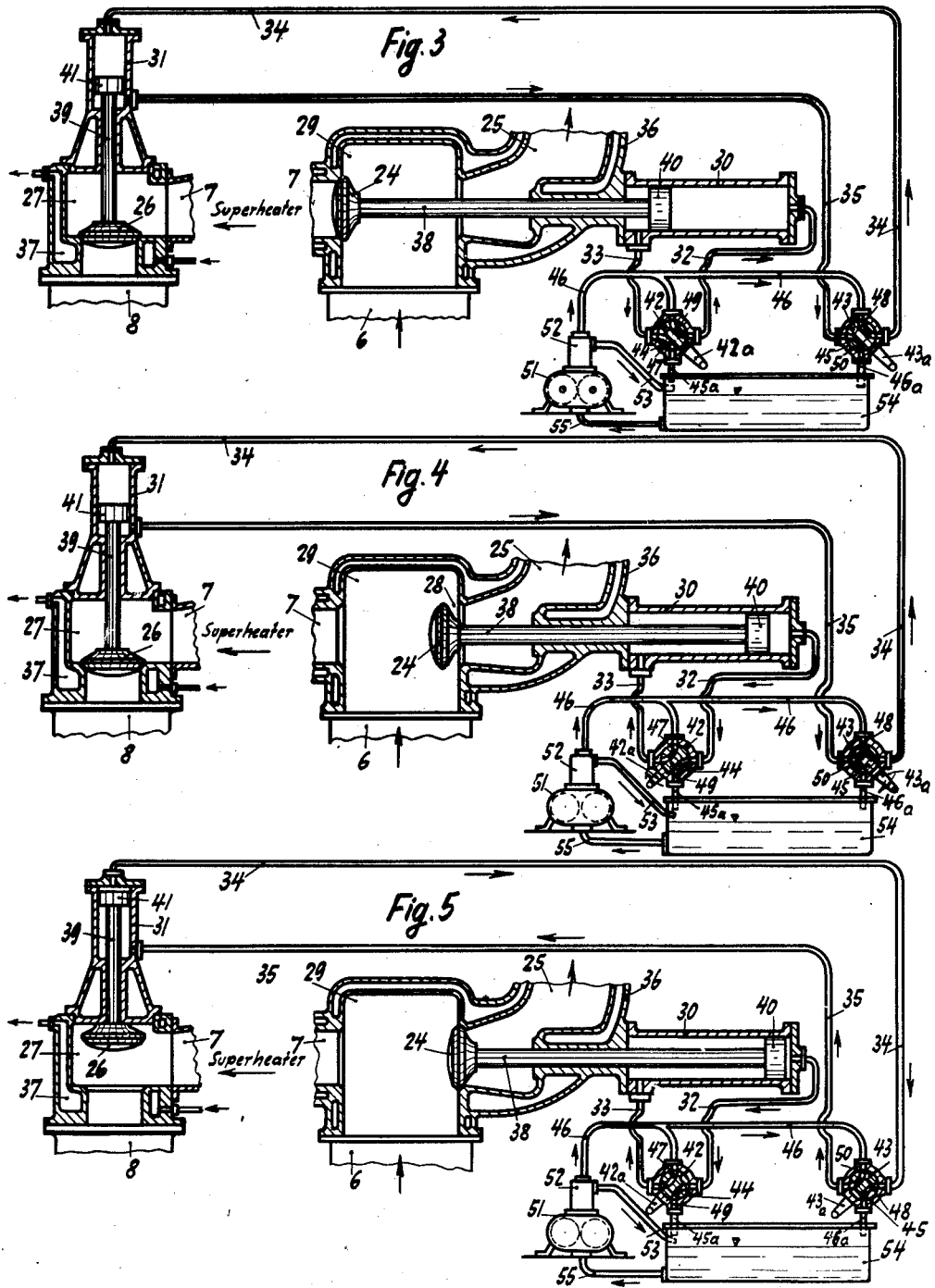

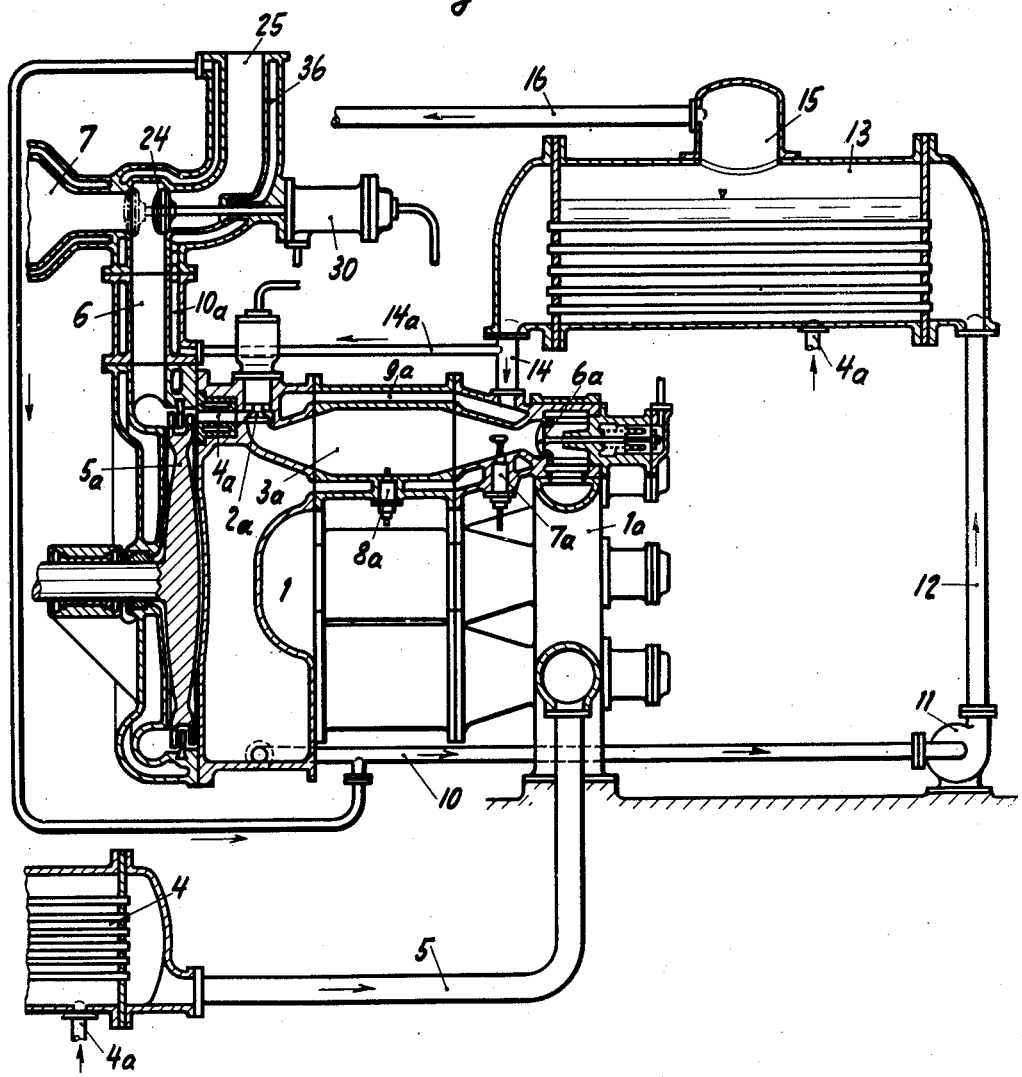

Patented Aug. 6, 1935

2,010,021

UNITED STATES PATENT OFFICE 2,010,021

EXPLOSION TURBINE PLANT FOR VEHICLES

Hans Holzwarth, Dusseldorf, Germany, assignor to Holzwarth Gas Turbine Co., San Francisco, Calif., a corporation of Delaware Application January 30, 1931, Serial No. 512,343
In Germany February 5, 1930

5 Claims. (Cl. 60—49)

My invention relates to arrangements for driving vehicles and particularly to plants composed of one or more explosion turbines arranged to drive the compressor or compressors which deliver compressed air to the explosion chambers of the explosion turbines, and of independently mounted expansion engines which develop the power for driving the vehicle.

Experience with gas turbine plants has shown that combustion engines, particularly explosion turbines, cannot be started under load and cannot produce the necessary starting torque without the aid of intermediate power-consuming transmission mechanism or of cumbersome power conversion devices in combination with starting and switch couplings.

The present invention overcomes these difficulties by making it possible to select as the output-delivering secondary prime movers, machines which, like continuous current gas and steam turbines, can start under load. The requirement, however, that the output delivering expansion engines develop the necessary starting torque, is met only when the combustion gases generated in the explosion turbine and likewise the steam produced with the waste heat of such turbine, are brought into action in the expansion engines under full admission pressure. By the term "full admission pressure" is to be understood, not the actual pressure prevailing at any time in advance of the expansion engines, but such driving medium pressure as will develop in each respective expansion engine its proportionate part of the total available output.

The present invention relates to devices with the aid of which this full admission pressure can be created. According to the present invention, there are arranged, between a heat exchanger in the path of the gases exhausting from the explosion turbine and the continuous current turbine following the explosion turbine, control devices through which the exhaust gases, preferably upon starting, after suitable regulation of the explosion turbine, are brought under full admission pressure to the continuous current turbine for developing therein its maximum output. These control devices are made to operate in such manner that shortly before the starting of the locomotive or other vehicle the continuous current turbine is completely cut off from the supply of combustion gases, so that the pressure in the heat exchanger in advance of such turbine rises to the pressure in the exhaust housing of the explosion turbine, that is, to full admission pressure. To start the vehicle, this control device is opened and the continuous current turbine is thereupon struck by gases under full admission pressure, so that the development of the necessary starting torque is accomplished without difficulty.

The use of my improved control device as above described assumes the condition that the stop of the vehicle at stations does not last longer than the time interval in which the full admission pressure is built up in the heat exchangers; beyond such time interval an unpermissibly high counter pressure would be exerted upon the explosion turbine which is constantly in operation. To make my improved plant independent of this condition, I have provided, in a further development of the invention, control mechanism between the heat exchangers heated by the exhaust gases of the explosion turbine and the explosion turbine itself, by means of which mechanism the combustion gases are shunted into the atmosphere, particularly when the vehicle is at rest. This control mechanism is thus in open condition, i. e. permits the gases to escape into the atmosphere, during rather long stops and also, for example, during the time in which, prior to starting a trip, steam must be produced by the devices employed to utilize the waste heat of the plant at a pressure at which the expansion engine driven by such steam develops its portion of the total power output necessary for starting the vehicle. In the closed condition of both control mechanisms, in which the gases are permitted to enter the heat exchanger but cannot flow from the latter to the expansion engine, the full admission pressure of the combustion gases is developed so that the vehicle is ready for starting. On the other hand, the control devices must be so constructed that they prevent the creation of a super-pressure which exceeds the normal, predetermined admission pressure and which would interfere with the operation of the explosion turbine because of the excessive counter pressure it would offer, by discharging into the atmosphere the surplus portion of the exhaust gases responsible for such excess pressure. The control mechanisms may be positively actuated hydraulically. When the explosion turbine is running idly, as is the case when the vehicle is at rest in a station, the control devices provided by the present invention, are in a position in which the exhaust gases of the explosion turbine are conducted into the atmosphere, while simultaneously the combustion gas section of the expansion engines or the heat exchanger in advance of the same is cut off from the combustion gas stream. If, on the other hand, the explosion turbine is so adjusted that its exhaust gases are under a pressure which corresponds to the full admission pressure of the gas section of the expansion machine, the control devices arranged in the path of the gases are adjusted to a position in which the exhaust gases of the explosion turbine enter the heat exchanger, the conduit leading to the gas section of the expansion engines being closed. Simultaneously, the control mechanism arranged in the conduit leading to the atmosphere is placed in a position such that the full admission pressure of the gases can be built up in advance of the combustion gas section of the expansion machine, but no excessive counter pressure can appear to disturb the operation of the explosion turbine. Only when the full admission pressure has been developed in advance of the gas section of the expansion engines or in advance of the control device directly in front of the same, and the steam pressure has reached the full admission pressure of the steam turbine, is the control element leading to the gas section of the expansion engines opened, while simultaneously the steam is brought into action at full admission pressure in the steam section of the expansion engines. Both the gas and steam sections of the expansion engines are thus operated by driving media of full admission pressure, so that both together develop the necessary output. After the vehicle has been set into motion, the explosion turbine is so regulated in known manner that only the output necessary at the prevailing velocity is developed in the expansion engines.

Because of the arrangement of the control elements in the middle of gas stream it is necessary to cool such elements. A highly advantageous cooling thereof is secured by employing a part of the control oil used to actuate the control valves simultaneously for cooling the control valve body. The cooling of the jacket surrounding the valves, on the other hand, may with advantage be accomplished with the cooling oil of the explosion turbine itself, which oil is subsequently made to give up the absorbed heat for generating working steam. Instead of valves the control devices may also take the form of control disks.

Figure 2:
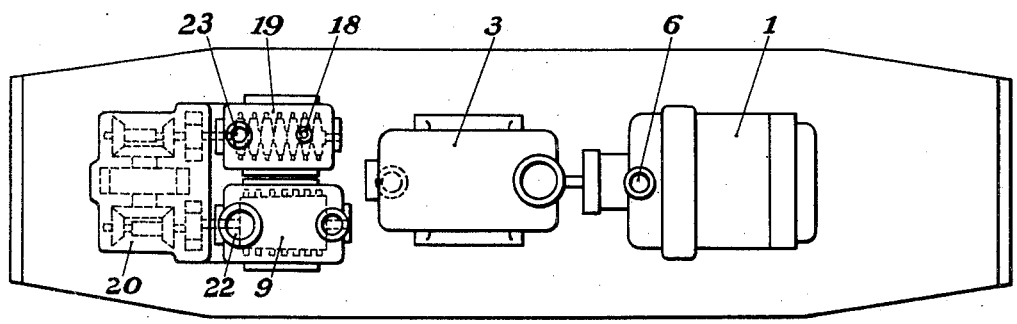

In the accompanying drawings are shown by way of example an embodiment of the invention in the form of a locomotive. In said drawings, Fig. 1 shows a schematic view illustrating a longitudinal section through the power plant of a locomotive having my invention embodied therein;

Fig. 2 is a plan view showing the arrangement of the prime mover elements of the plant;

Figs. 3, 4 and 5 are enlarged views illustrating the control valves arranged and constructed in accordance with the invention, Fig. 3 showing the valves in the position in which the vehicle is at rest and the plant is idling, Fig. 4 the position of the valves in preparation for starting the vehicles, and Fig. 5 their position when the vehicle is in motion; and Fig. 6 shows on an enlarged scale a section through the explosion turbine and the cooling oil circuit.

In Figs. 1, 2 and 6, the numeral 1 indicates the explosion turbine which through a transmission 2 drives the compressor 3 for producing compressed air to be used in the intermittently charged explosion chambers 3a of the explosion turbine, four of such chambers being shown in Fig. 6. The compressed charging air, after it has been cooled in a cooler 4, is conducted to inlet manifold 1a of the explosion chambers through a conduit 5. The turbine 1 is of the explosion type, such as is shown, for example, in my United States Patent No. 1,810,768. The air is introduced into explosion chambers through the inlet valves 6a and fuel through the injection devices 7a, the mixture in the chambers being ignited with the aid of spark plugs 8a or equivalent ignition devices. The gas puffs periodically and sequentially discharged from the explosion chambers through the valves 2a following the explosion of combustible charges of fuel and air fed to the chambers 3a, are partially expanded in expansion nozzles 4a which direct them against the explosion turbine wheel 5a where they give up a part of their energy. The valves are periodically controlled in the proper sequence by any suitable timing mechanism, such as the hydraulic distributor shown in my above-mentioned patent. The gases then escape through the exhaust conduit 6 into heat exchanger 7 and pass through pipe 8 to the combustion gas turbine 9 which they strike in a continuous stream. All of the highly heated parts of the turbine 1 are surrounded by a film of cooling oil jackets 9a and 10a being provided for this purpose. The so heated oil is withdrawn through conduit 10 by a rotary pump 11 and forced through conduit 12 into the heat exchanger 13. After giving up its absorbed heat in the heat exchanger 13, preferably to preheated feed water fed by conduit 4a with evaporation of such water, the oil is reconducted in cooled condition by conduit 14 into the cooling chamber of the turbine or through the conduit 14a to the cooling jackets of the conduit 6. The steam generated in the exchanger or boiler 13 collects in the dome 15 and is conducted by pipe 16 to the superheater coil 17 arranged in the gas conduit 7. The steam is superheated in the coil 17 by the hot exhaust gases and is conveyed in such condition by the pipe 18 to the steam turbine 19. The continuous current gas turbine 9 and the steam turbine 19 give up their power to a common bevel gear transmission 20 and through the latter to the common dummy shaft 21 from which the driving wheels of the locomotive are driven. The gases exhausting from the continuous current turbine 9 flow off through the exhaust pipe 22, while the steam exhausting from the turbine 19 escapes into the atmosphere through the pipe 23.

According to the present invention there are arranged in the path of the gases between the explosion turbine 1 and the combustion gas section 9 of the expansion engines 9, 19, in advance and to the rear of the gas-charged heat exchanger 7, 17, hydraulically operated control elements 24 and 26 through which the combustion gases, particularly when the vehicle is at rest, are discharged into the atmosphere before reaching the superheater 7 which is then closed against them; or through which, especially on starting, the gases are brought into action in the continuous current turbine 9 under full admission pressure for developing the proportionate part of the starting torque of such turbine. In the first case the hydraulically operated control valve 24 is in the position shown in dotted lines in Fig. 1 and in full lines in Fig. 3. Both the turbine 9 and the superheater 7, 17 are closed against the exhaust gases of the explosion turbine, while the exhaust pipe 25 leading into the atmosphere is open, so that the said gases can flow unhindered into the atmosphere. In the second case, on the other hand, the control element 26 is first in the closed position shown in Fig. 4, while the control element 24 is in the intermediate position shown in such figure. These positions correspond to the moment immediately before the starting of the locomotive. The explosion turbine is in a condition of operation in which it delivers exhaust gases of full admission pressure. There is thus created in the superheater 7, and therefore also in space 27 immediately in advance of the conduit 8 leading to the continuous current gas turbine, the full admission pressure of the gases, while through the flow area 28 exposed by the valve 24 (see Fig. 4) only so much gases escape as will prevent the building up in spaces 29, 7 and 27 of a counter-pressure which is in excess of the normal, predetermined admission pressure and will disturb the operation of the turbine 1. At the moment of starting, the elements 24 and 26 are adjusted to the positions shown in Fig. 5. In this position of the control elements, the exhaust pipe 25 leading into the atmosphere is completely closed, while simultaneously the gases pass through pipe 7 into pipe 8 and are brought into action in the continuous current turbine 9 under full admission pressure. At the same time the steam is delivered to the turbine 19 under full admission pressure because the explosion turbine 1 is so operated while idling that the generation of working steam under full admission pressure is maintained. The excess of steam which may occasionally be produced may escape through a safety valve in the manner well known in piston-operated steam locomotives. Thus, at the moment of starting, both the continuous current gas turbine 9 and the steam turbine 19 are operated by gas and steam under full admission pressure, so that they develop the necessary starting torque without strain.

The valves 24 and 26 are exposed to the stream of hot gases, and means may be provided to cool the same. The cooling of the valve bodies themselves is preferably accomplished by means of a portion of the control oil which is fed to or withdrawn from the control members 30 and 31 by the conduits 32 to 35, as disclosed in my United States Patent No. 1,914,340 dated June 13, 1933. The cooling of the cooling jackets 36 and 37 is preferably effected by the cooling oil of the explosion turbine, the oil entering, for example, through pipe 14a and the jacket about the conduit 6. The abstracted heat is utilized in the heat exchanger or boiler 13, while recooling of the control oil is unnecessary because of the small proportion of the heated control oil to the total amount of control oil employed.

Figs. 3, 4 and 5 show by way of example the construction of the valve gear for the adjustment of the various positions of the control elements 24 and 26. These control elements 24 and 26 are connected to piston 40 and 41 respectively by means of valve rods 38 and 39. According to whether these pistons are brought into the position which corresponds to the running condition of the vehicle and is indicated in Fig. 5, or in the position which corresponds to stoppage of the vehicle and idle running of the engine and is indicated in Fig. 3, a pressure medium is introduced through the conduits 33 and 35 or through the conduits 32 and 34 into cylinders 30 and 31. The feeding of the pressure medium through conduits 32 and 33 respectively and conduits 34 and 35 respectively is controlled by the respective position of two rotary valves 42 and 43. These rotary valves, mounted in valve housings 44 and 45, receive the pressure medium through conduit 46.

The rotary valves or cocks 42 and 43 are operated through the levers 42a and 43a in such manner that upon movement of such levers in proper order, the valves 24 and 26 are operated in correct sequence to effect starting or stopping of the vehicle. The starting of the vehicle is carried out in the following manner: The valves 42 and 43 are in the position shown in Fig. 3 when the vehicle is at rest. Upon movement of the lever 42a to the left, the valve 42 moves clockwise. This movement is so determined that the valve 42 is brought to the throttling position shown in Fig. 4, wherein it effects slow reversal of the pressure medium charged by the conduit 46 by switching such pressure medium from the conduit 32 to the conduit 33 and simultaneously connecting the conduit 32 with the exhaust conduit 45a. The cross-sections of the paths for the pressure medium are so selected that the valve 24 now moves slowly toward the right from the position shown in Fig. 3 and into the intermediate position shown in Fig. 4. The lever 4a is now left in the corresponding intermediate position, at which the valve 42 has effected a reversal of the pressure oil, for so long a time until, through the continuous movement of valve 24 toward the right, the throttling of the combustion gases which have previously flowed out of the exhaust conduit 25 into the atmosphere becomes so strong that the pressure in superheater 7 reaches the full necessary starting admission pressure for the subsequent turbine 9. At this instant the movement of the lever 42a and the rotation of the valve 42 in clockwise direction is continued while at the same time the lever 43a is moved to the left until the valves reach the positions according to Fig. 5, so that now valve 43 effects reversal of the pressure medium from the conduit 34 to the conduit 35 and simultaneously causes discharge of the pressure medium from conduit 34 into the exhaust conduit 46a. The valve 26 then opens and permits the gases to flow to the turbine 9 under the full admission pressure. At the same time the valve 24 moves into the right end position and completely closes the exhaust outlet 25.

If the vehicle is to be brought to rest or to the idling condition, the levers 42a and 43a are brought from the position shown in Fig. 5 to that shown in Fig. 3 without a pause, so that valve 26 closes and simultaneously the valve 24 is moved into the extreme left-hand position.

I claim:

1. A portable power plant for vehicles comprising an explosion turbine including a plurality of constant volume explosion chambers adapted to be charged intermittently with compressed air and fuel for explosion therein, and an explosion rotor arranged to be impinged by the intermittent puffs of gases discharged by such chambers; a compressor driven by said explosion turbine rotor; gas and steam driven expansion engines mounted independently of said turbine and geared to the driving wheels of the vehicles; means for generating steam with the waste heat of the explosion turbine; a collecting chamber in the path of the gases exhausting from the explosion turbine and in advance of the gas section of said expansion engines; a conduit for conducting steam from said generating means to the steam driven section of said engines; a control device between said collecting chamber and said gas section whereby the flow of the gases to such section may be stopped and gases under full admission pressure may be collected and stored in said chamber and then, upon opening of said device, be fed to said gas section to develop quickly therein the torque necessary for starting the vehicle; and a control device between the collecting chamber and said explosion turbine movable to a position in which all of the gases exhausting from the explosion rotor are directed into the collecting chamber when the vehicle is in motion, to a position in which all of such exhaust gases are directed into the atmosphere when the explosion rotor is idling, and also to an intermediate throttling position in which, the first-named device being closed, the gas pressure in the collecting chamber is caused to be gradually built up to the full admission pressure in preparation for starting without creating an excessive back pressure on the explosion turbine.

2. A power plant as set forth in claim 1 wherein said control devices comprise valves having operating pistons connected thereto, and hydraulic mechanism operative to charge a fluid under pressure to one or the other side of each of said pistons to actuate the valves.

3. A portable power plant comprising an explosion turbine including a plurality of constant volume explosion chambers adapted to be charged intermittently with compressed air and fuel for explosion therein, and an explosion rotor arranged to be impinged by the intermittent puffs of gases discharged by such chambers; a compressor driven by said explosion turbine; gas and steam driven expansion engines mounted independently of said turbine and geared to the driving wheels of the vehicle; a heat exchanger in the path of the gases exhausting from the explosion turbine and in advance of the gas section of said expansion engines; a conduit for conducting steam from said heat exchanger to the steam-driven engine; a control device between said heat exchanger and said gas section whereby gases under full admission pressure may be collected and stored in said heat exchanger and then fed to said gas section to develop quickly therein the torque necessary for starting the vehicle; a control device between the heat exchanger and said explosion turbine, whereby, while the vehicle is at rest, the gases exhausting from the explosion turbine may be discharged in whole or in part into the atmosphere; and a hydraulic mechanism for operating said control devices.

4. A power plant as set forth in claim 3 wherein said control devices are provided with casings; said plant including means for circulating cooling oil through the explosion turbine to cool the same; and means for conducting a portion of such cooling oil about the casings of said control devices.

5. A portable power plant comprising an explosion turbine including a plurality of constant volume explosion chambers adapted to be charged intermittently with compressed air and fuel for explosion therein, and an explosion rotor arranged to be impinged by the intermittent puffs of gases discharged by such chambers; a compressor driven by said explosion turbine; a gas expansion engine driven by the exhaust gases of the explosion turbine; a steam expansion engine; means for developing steam, means for conducting a fluid in heat-exchange relation with gas-heated parts of the plant, a conduit for leading such heated fluid into said steam developing means; a conduit for conveying such steam to the steam engine; said gas and steam engines being geared to the driving wheels of the vehicle; a gas accumulator between the explosion turbine and the gas engine; a control member for the gases between the explosion turbine and the accumulator; a second control member for the gases between the accumulator and the gas expansion engine; a relief conduit controlled by the first-mentioned control member, means for actuating both said control members positively in dependence upon the regulation of the explosion turbine whereby the first-mentioned control member gradually opens the passage into the accumulator and throttles and ultimately cuts off the flow into said relief conduit, while the second-mentioned control member is adapted to remain closed until the full intermediate gas pressure is developed, the first-mentioned control member being adapted to close the relief conduit upon opening of said second member to maintain the full intermediate pressure of the gases.

HANS HOLZWARTH.